United States Patent [19]

Flemmer

[11] Patent Number: 5,685,186
[45] Date of Patent: Nov. 11, 1997

[54] BASE CURVE BENDER

[75] Inventor: Rory L. Christian Flemmer, Independence, W. Va.

[73] Assignee: Bausch & Lomb Incorporated, Rochester, N.Y.

[21] Appl. No.: 357,397

[22] Filed: Dec. 21, 1994

Related U.S. Application Data

[63] Continuation-in-part of Ser. No. 175,086, Dec. 29, 1993, Pat. No. 5,479,683.

[51] Int. Cl.$^6$ .................... B21D 7/08; B21D 7/12
[52] U.S. Cl. .................... 72/7.1; 72/131; 72/169; 72/171; 29/20
[58] Field of Search .................... 72/14.8, 131, 169, 72/171, 172, 173, 307; 29/20, 7.1

[56] References Cited

U.S. PATENT DOCUMENTS

| | | | |
|---|---|---|---|
| 928,073 | 7/1909 | Schneider | 72/171 |
| 1,743,418 | 1/1930 | Yates | 72/171 |
| 1,942,992 | 1/1934 | Yates | 72/171 |
| 3,315,512 | 4/1967 | Maciorowski. | |
| 3,828,602 | 8/1974 | Leithiser | 72/171 |
| 4,280,350 | 7/1981 | King et al. | |

FOREIGN PATENT DOCUMENTS

| | | |
|---|---|---|
| 0 299 857 | 1/1989 | European Pat. Off. . |
| 2 602 160 | 2/1988 | France . |
| 2 625 695 | 7/1989 | France . |
| 40 19 866 A1 | 2/1992 | Germany . |

OTHER PUBLICATIONS

Partial Translation of German Patent, DE 40 19 866 A1, Column 3, lines 1–42.
English Translation of French Patent No. 2 602 160.
English Translation of French Patent No. 2 625 695.
Communication dated Dec. 3, 1993, from Haug, GMBH & Co. describing an Eye–Winder Machine.
Copy of a brochure of Wafios Maschinefabrik GMBH & Co. describing a Three–Dimension Eye–Rim Bending Machine and includes various dates given the years 1992 and 1993.

*Primary Examiner*—Daniel C. Crane
*Attorney, Agent, or Firm*—Katherine McGuire

[57] ABSTRACT

An eyewinder system 10 has stations 100–108 for straightening, bending, measuring and transporting a wire 11 to form an eyewire 109. A controller 120 controls each station. Using information from tension and length measuring stations 104, 105, the controller 120 can accurately operate the second bending station 107. The eyewire 109 is inspected for accurate bends by an inspection system 140 that compares the bends in the eyewire 109 to predetermined radii of curvature. A base curve bending station 801 has a shuttle 810 and a turntable 830. A wire 820 passing through the shuttle 810 is bent and the head of the wire is held in one direction while the turntable allows the body of the wire to move in a plane transverse to the axis of rotation of the turntable.

10 Claims, 6 Drawing Sheets

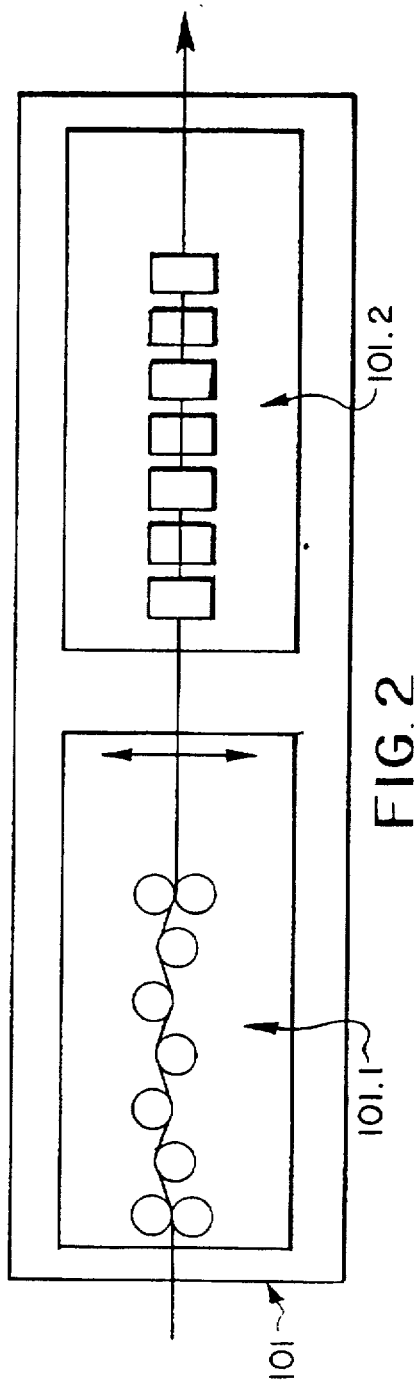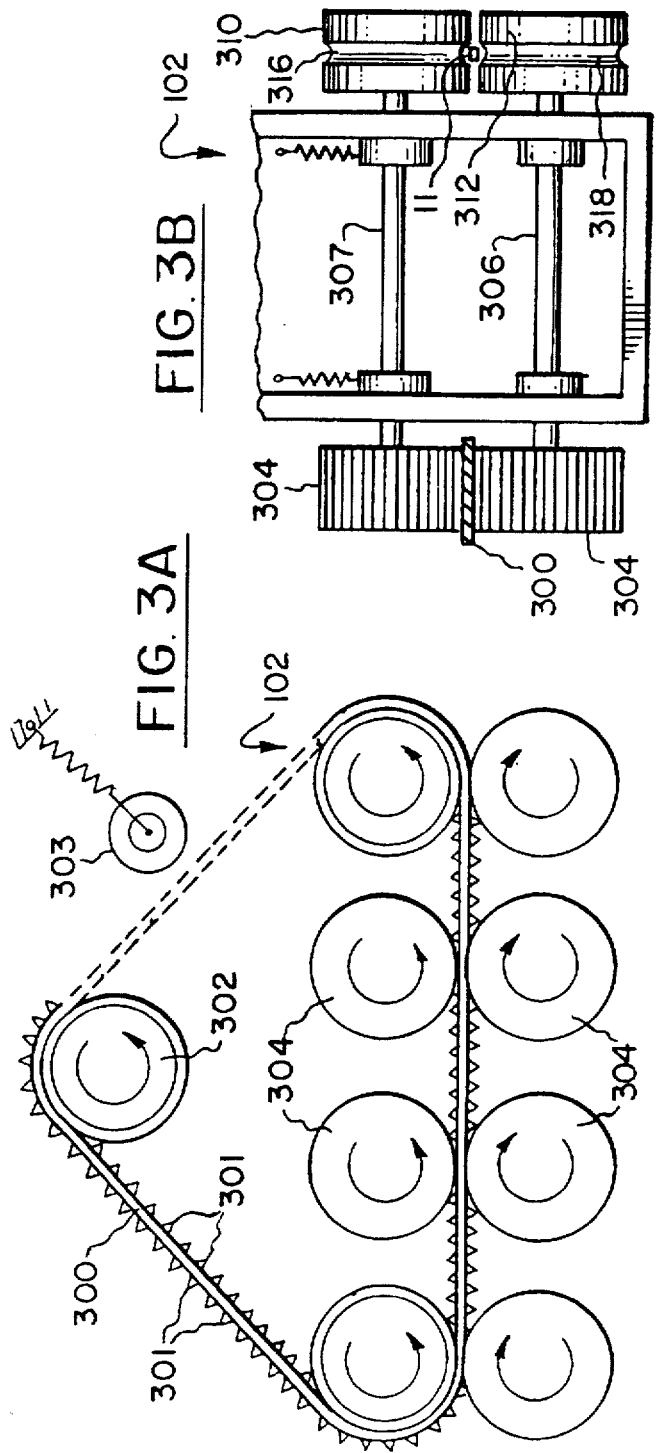

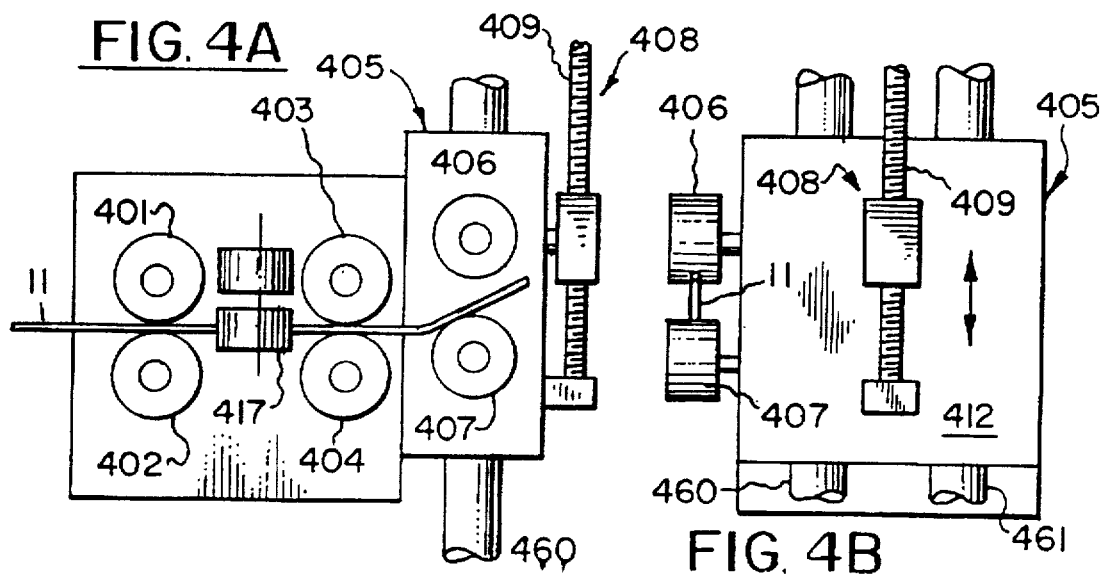
FIG. 4A
FIG. 4B
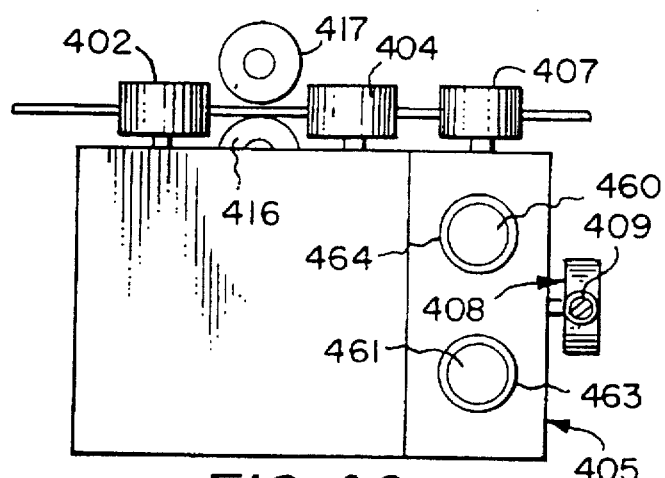
FIG. 4C
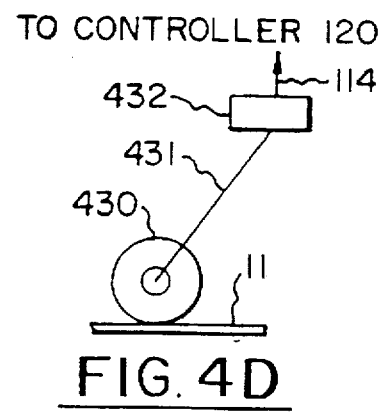
FIG. 4D
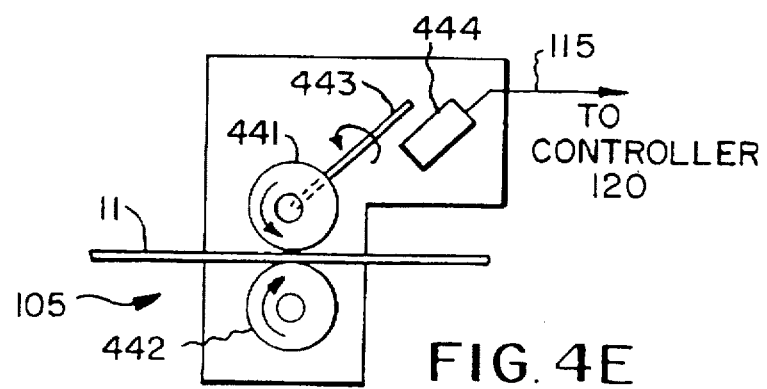
FIG. 4E

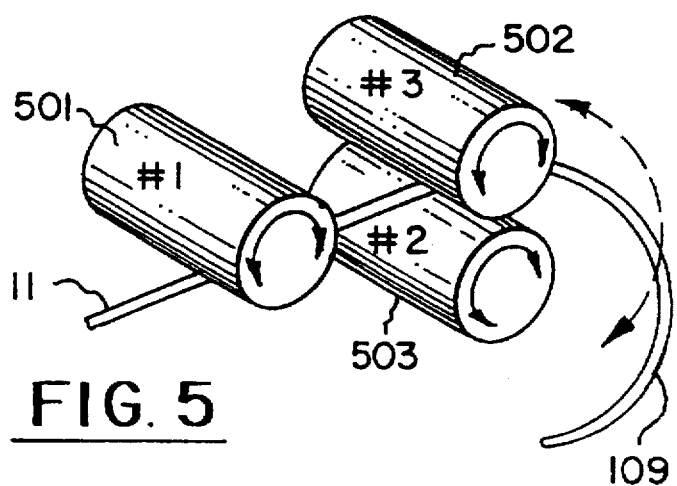
FIG. 5
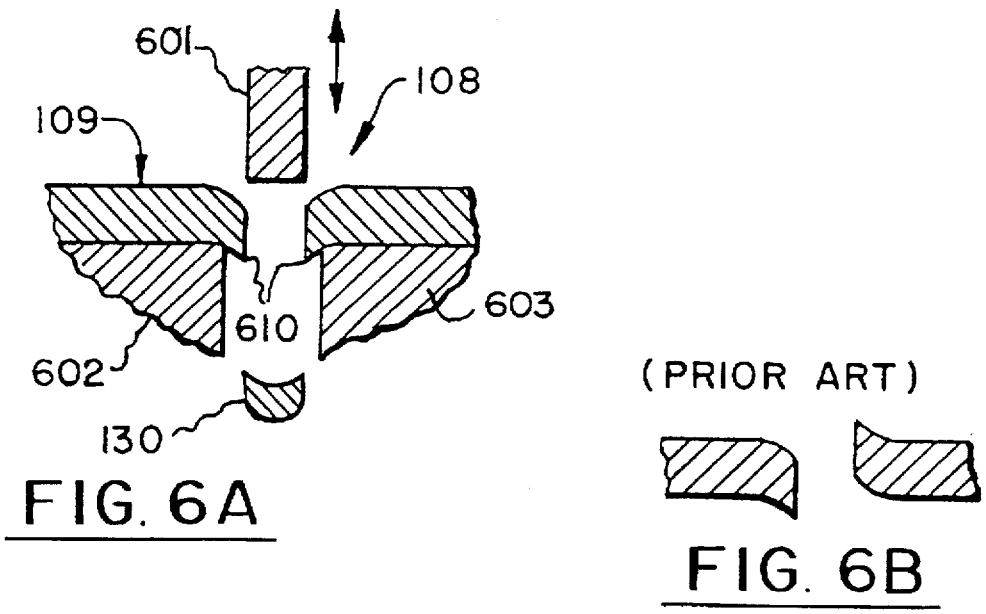
FIG. 6A
FIG. 6B
(PRIOR ART)

BASE CURVE BENDER

The application is a continuation-in-part of U.S. application Ser. No. 175,086 filed Dec. 29, 1993 and now U.S. Pat. No. 5,479,683.

BACKGROUND OF THE INVENTION

This invention relates in general to eye wear, and in particular, to a method and apparatus for shaping wire frames for holding lenses.

Many eyeglass frames are made of metal. The metal forms the temples that loop over a person's ears, metal is used to form the bridge between two lenses, and the lenses are held in bent metal frames called eyewires. Each wire has its main curvature termed the shape curve about the optical axis of the lens which will fit into it. In order to conform to the edge of the lens, whose surface is spherical, it has a secondary curvature, termed the base term.

In order to form eyewires, a wire is fed from a spool, straightened, and then bent at sequential bending stations to impart the first or base curve and the second or shape curve to the eyewire. In prior art systems, curves are imparted to the wires using a series of rollers with movable elements at the end of the bender. The movable elements at the end of the bender are displaceable against the wire. The greater the displacement of the bending roller against the wire, the more curvature is imparted to the wire as it passes over the roller. However, it is only possible to bend the wire in one axis at one station. That is, there is no currently available technique for simultaneously imparting both the base curve and the shape curve to the wire.

As such, one of the problems associated with prior art techniques has been the coordination of the first and second bending stations in order to impart the shape curve to the wire that has been impressed with a base curve. In order to solve this problem, the prior art techniques have relied upon bending stations having relatively small rollers and by positioning the bending stations as close as possible to one another. As such, with closely positioned bending stations and small rollers (perhaps as small as one-quarter inch) the wire is bent as though the base and shape curves are simultaneously made at one point on the wire. In other words, the distance that the wire travels between the first and the second bending station is effectively ignored.

Even with small bending rollers, there is nevertheless a finite differential in wire travel between the first and second bending stations. This finite distance contributes to errors in bending such that many eyewires are rejected in manufacture. Such prior art systems have not included on-line correction of bending to accommodate variations in wire. It is well known that there are significant metallurgical differences between the wire at one end of a spool and the wire at the other end. Thus, as wire is withdrawn from a spool and formed into eyewires, the wire material itself will vary from segment to segment as it passes through the two bending stations. However, in such prior art bending systems, there is no provision for monitoring and on-line altering the bending characteristics of the two bending stations in order to accommodate changes in the wire.

Such prior art eyewinder systems, due to the close proximity of the first and second bending stations, introduce large, and undesirable stresses in the eyewires. The latter is due to the sharp radii of curvature of the small bending rollers as well as the near simultaneous bending in orthogonal directions imparted by the two stations. As such, the wires become unduly stressed and many fail to conform to acceptable manufacturing specifications.

Still another disadvantage of prior art systems is that finished eyewires are only inspected by a manual optical comparison of the eyewire to metal fixtures of the desired shape. Because such techniques are time consuming, cumbersome and inaccurate inspections are infrequent and thereby result in poor quality control.

SUMMARY OF THE INVENTION

The inventive apparatus and method includes a series of stations that are operated by a controller, preferably a computer which operates each station in accordance with an interactive control algorithm and feedback information provided by each station. A spool feeds wire into a straightening station. After the straightening station the wire passes through a first transport station into the first bending station. At the first bending station, the first or base curve is bent into the wire. As a result of the first bending station, the portion of the wire exiting the first bending station acquires a serpentine configuration. The first bending station is significantly spaced from the second bending station. Between the first and second bending stations are a tension control or tension measuring station, a length measuring station and a second transport station. The tension measuring station measures the tension in the wire as the serpentine wire exits the first bending station. It is important to control tension in the wire so that the length of the wire can be controlled. In the length measuring station, a pair of rollers with a suitable encoder transmits information to the controller about the length of wire passing through the measuring station. By maintaining a length and tension measurement of the wire, coupled with information about where the bends are made at the first bending station, a second bending station downstream can accurately place the shape curves or second bends at the appropriate location on the wire, as required by the design.

Upon exiting the length measuring station, the wire enters a second transport station where the wire is positioned for entry into the second bending station. At the second bending station, the wire is bent along the orthogonal axis to impart a shape curve to the wire. The shape curve is appropriately imposed upon the wire at each point along its path. Upon leaving the bending station, the wire passes through a double shear station where the eyewire is separated from the rest of the length of the wire.

After the shearing station, the eyewire may be sent to an inspection station where images of the base curve and shape curve are analyzed to determine the radius of curvature at any one of a number of points. The radii measurements are then compared to predetermined, desired radii for the given shape of the wire. In accordance with a predetermined criteria stored in the controller, the wire will either pass or fail inspection and its variation from the desired shape will be indicated by a suitable display. In addition, errors in the radii and length noted by the inspection station will be used by the controller to adjust the process in order to bring the final eyewire into close conformity to the desired overall three-dimensional shape.

As mentioned above, the system employs at least two transport stations. In the inventive system, each transport station includes a plurality of pairs of opposed rollers that are uniformly driven using a flexible belt which has teeth on either side. Such transport systems provide a soft transport of the wire and thus reduce damage to the wire while moving it from one station to the next.

In the preferred embodiment of the invention, the first and second bending stations may be spaced apart as far as eight inches. By disposing a tension measuring station and a length measuring station between the two bending stations, the controller operates the second bending station in accordance with the measured tension and length of the wire so that the second or shape curve is accurately imparted to the wire as it passes through the second bending station. The system is also capable of reversing the travel of the wire. In order to give the wire sufficient clearance for shearing, a certain portion of the wire needs to be straight as it leaves the second bending station. Again, the measuring station helps achieve this desirable result in combination with the controller which operates each of the stations of the system.

At the shearing station, the wire is double sheared. That is, the wire is disposed between two fixed dies and a movable die punches out a segment of the wire disposed between the fixed die. As such, both ends of the wire are slightly burred in the same direction. The latter is advantageous because the burrs in the wire are disposed toward the lens and do not extend outwardly and create a burr on the outside surface of the eyewire.

The inspection station has a rotatable stage for receiving an eyewire. A lens and prism arrangement are used to project orthogonal images of the eyewire onto a camera, preferably a charge couple device camera. Given the orthogonal image generation system, the inspection station generates images of the base curve of the wire as well as the shape curve of the wire. These raw data images are processed using image correction algorithms in the controller for generating a series of measurements of the radii of curvature at different points along the surface of the eyewire. These radii of curvature are measurements of the radii of curvature of the base curve as well as of the shape curve taken at a number of points around the periphery of the eyewire. These radii measurements are compared to predetermined, desirable radii and radii tolerances for eyewires that will conform to manufacturing specifications. To the extent that any one or more measured points vary from acceptable standards, such variation is indicated by a display, either a written or a visual display. This information is also integrated to provide a measurement of wire length. In addition, the angle a shearing is recorded.

Based on measured variations in the radii of curvature from the desired radii and overall wire length, the controller will optimize the individual stations in the apparatus to bring subsequent wires into closer conformity to the desired radii of curvature.

With the shuttle and other bending systems, when the wire is bent into a base curve, the wire assumes the shape of a snake or serpent. That is, the wire bends first in one direction laterally and then in the opposite direction. When the bend of the wire changes from one side to the other the head and tail of the wire are urged first in one direction and then in an opposite direction. If the wire is precisely constrained at the head and tail, then the base curve may not be correctly imparted to the wire and the apparatus holding the wire will produce spurious bends in the wire. Another problem is that the wire becomes misaligned with downstream stations that impart further curves to the wire. In other words, the tail wags the head.

The invention provides for an improved base curve bending apparatus. As part of the invention, the base curve bending apparatus includes a shuttle operated together with a turntable. The turntable operates around the shuttle. The purpose of the turntable is to permit the correct orientation of the leading end, i.e. the head of the snake of the wire and allow the trailing end, i.e. the tail of the snake, to move. Prior art systems have tried to constrain both the head and the tail.

As such, the bending motion imparted to the wire often moved the head out of alignment with the next station, such as the measuring station or the second bending station.

BRIEF DESCRIPTION OF THE DRAWINGS

FIG. 2 is a sectional schematic drawing of the straightener station;

FIGS. 3A and 3B are respectively sectional and top views of a transport station;

FIG. 4A is a plan view of the first bending station;

FIG. 4B is the first side view of the first bending station;

FIG. 4C is the second side view of the first bending station;

FIG. 4D is an expanded schematic view of the tension measuring station;

FIG. 4E is an expanded schematic view of the measurement station;

FIG. 5 is a schematic view of the second bending station;

FIG. 6A is a schematic sectional view of the shearing station;

FIG. 6B is a schematic view of the results of a prior art shearing operation;

DETAILED DESCRIPTION

Figure 1:
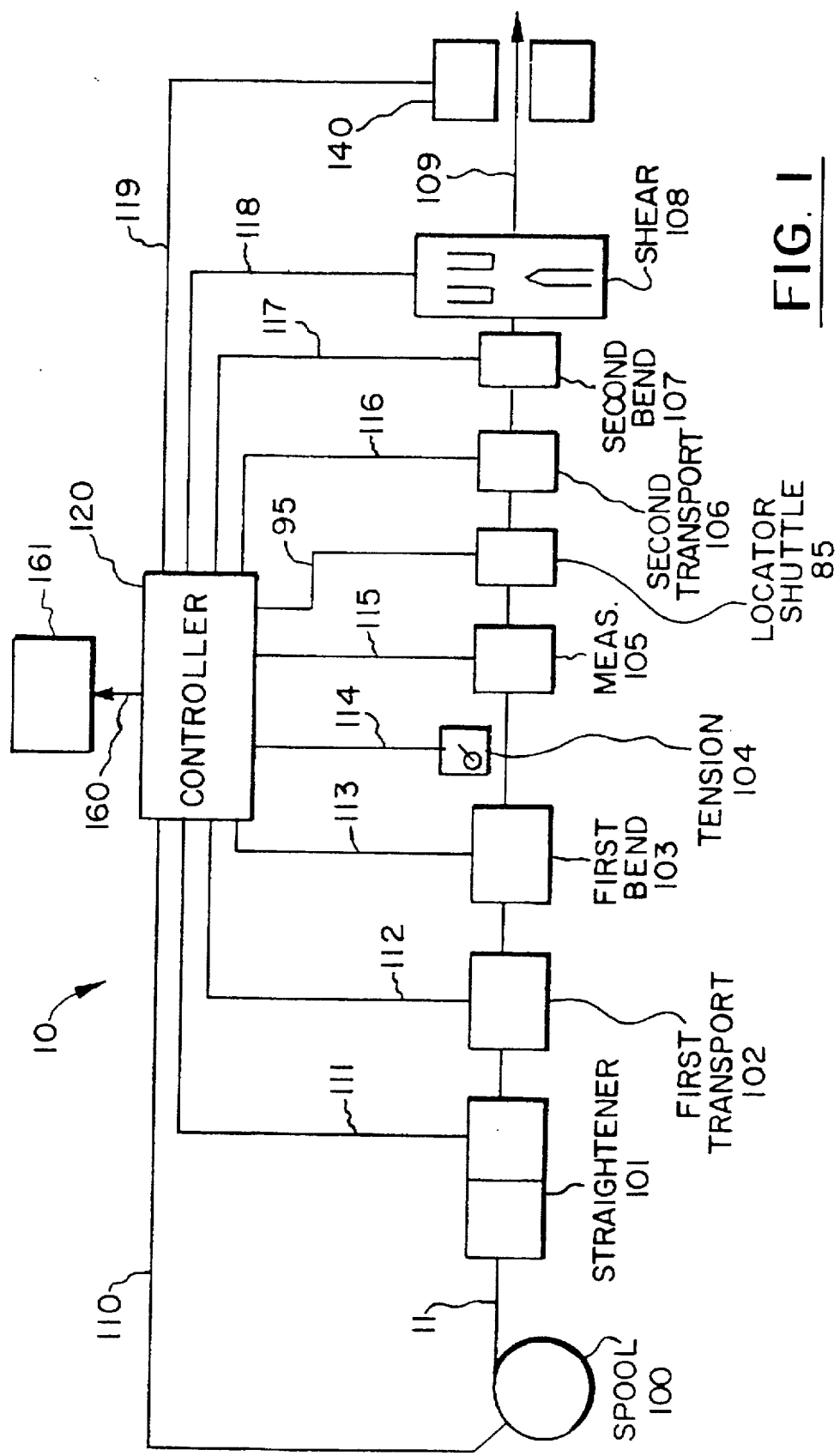
FIG. 1 is a schematic diagram of the eyewinder system.

With reference to FIG. 1, there is shown an eyewinder system 10. The system 10 includes a plurality of stations 85, 100–108 that operate on wire 11 to form an eyewire 109. The eyewire 109 is inspected by an inspection station 140. All of the stations 100–108 and the inspection station 140 are operated by a controller 120. Controller 120 includes a computer, or other suitable device having a central processing unit and/or a microprocessor, random access memory, and suitable input/output lines 95, 110–119 for receiving information from the stations 100–108 and inspection station 140 and for transmitting control signals to the stations 100–108 and inspection station 140.

Wire 11 which is to be formed into an eyewire 109 is drawn from a standard reel of wire on a spindle at station 100. The station 100 has suitable braking well known in the art to prevent an overrun of the wire 11 as the wire 11 is withdrawn from the station 100. Wire 11 then passes into a straightening station 101 whose function is to remove kinks from the wire before passing it on to a first transport station 102. The straightener 101 is shown in further schematic detail in FIG. 2. The wire 11 has a major axis (largest second moment of area) which is generally vertical during travel through the system 10. The minor axis of the wire is deemed orthogonal to the major axis. As wire is withdrawn from spool 11, the wire likely has bends or curves in it and needs to be straightened.

The straightening station 101 has first and second straighteners 101.1 and 101.2 Each straightener 101.1 and 101.2 comprises nine rollers. The function of these rollers is to cause the wire to follow a serpentine path through the straightener. In traveling serpentine path, the serpent is alternately bent up, then down, then up and then down so that the wire exits each straightener 101.1, 101.2 in an unbent condition. As such, as the wire passes through straightener 101.1, any residual deformation in the minor axis is lost since the rollers in the straightener are sufficient to deform the wire beyond its elastic point and into its plastic region first one way and then the other so that residual plastic strain in the wire is lost and it comes out straight. Thus, the first straightener 101.1 straightens the wire along its minor axis and the straightener 101.2 straightens the wire along its major axis. Such straightening stations including first and second straighteners 101.1, 101.2 are well known in the prior art. In a typical seven station straightener, the first pair of rollers are opposed to each other and the last two rollers are opposed to each other. These first and last pairs of rollers' guide and control the wire through the straightening station. Five intermediate rollers are arranged to cause the serpentine passage of the wire and to form the wire into its plastic deformation region.

After the wire 11 leaves the straightening station 101 it enters a first transport station 102. First transport station 102 is further shown in FIGS. 3A, 3B. The transport station 102 comprises drive rollers 304 that are arranged in four pair of opposed rollers. A belt 300 made of flexible material, such as rubber, has teeth 301 on both sides thereof and passes between the opposed pairs of drive rollers 304, past a spring tensioned idler roller 303 and over a drive pulley 302. As such, the drive rollers 304 are driven uniformly by the tooth belt 300. Since the four pairs of opposed rollers 304 are driven by the flexible tooth belt 300, there is little or no backlash between the belt 300 and the gears of drive rollers 304. The latter provides a soft transport for the wire 11 as the wire passes through the first transport station 102. As such, any disparity in rotation between the rollers and the gears will be absorbed by the teeth of the belt 300 rather than be transferred to the wire 11 as is the case with the standard gear drives of the prior art.

With reference to FIG. 3B, it is seen that the drive pulleys 304 are disposed on one side of the transport station 102. The rollers 304 are about one inch wide and have a smooth, improved surface. Upper shafts 307 connect the upper drive rollers 304 to a set of wire pulleys 310. Each upper wire pulley 310 has a groove 316 for accommodating a portion of the wire 11. Lower rollers 304 have shafts 306 that couple to lower wire drive pulleys 312. These lower wire drive pulleys 312 also have a groove 318 for accommodating the wire 11. The upper shafts 307 are spring biased toward the fixed lower shafts 306. Thus, as the rollers 304 turn in one direction, their motion is imparted via shafts 307 and 306 to wire drive pulleys 310, 318. Those pulleys, maintained in contact with the wire by the springs on shaft 307, advance the wire 11 through the transport station 102.

Upon exiting the first transport station 102, the wire 11 enters the first bending station 103. With particular reference to FIGS. 4A-4B, it will be noted that the wire 11 passes through four pairs of rollers: rollers 401, 402 are input guide rollers, intermediate rollers 416, 417 and exit rollers 403, 404 which feed the wire 11 into a shuttle 405. Rollers 416 and 417 control the vertical position of the wire. Shuttle 405 is reciprocally movable to bring one of two bending rollers 406, 407 into contact with the wire 11. Roller 407 will bend the wire in one direction and roller 406 in the other to impart a serpentine shape to wire 11 and impress upon it the base curve. Shuttle 405 is operated by a ball screw 408 and nut 409 that is coupled to the surface 412 of shuttle 405. The ball screw is turned by a ball screw motor (not shown) in response to control signals on control line 113. The rotation of screw 408 imparts reciprocal motion to shuttle 405. The shuttle 405 is supported by a pair of bushings 460, 461 with hardened slides 463, 464. The rollers 401, 402 and 416, 417 are about one inch and have a smooth, ungrooved surface.

After exiting the first bending station 103, the wire 11 passes through a tension measuring station 104 and a length measuring station 105 prior to entering the second bending station 107. It is important to control both the tension and the length of the wire in order to control the second bending station 107. As such, if the wire is allowed to droop and lose tension, its length will change thereby rendering inaccurate the curves impressed by second bending station 107. The tension measuring station 104 as shown in FIG. 4D can comprise a tension sensor wheel 430 that bears against wire 11. The tension sensed by wheel 430 is transmitted via transducer 432 over communication line 114 to controller 120. With such information, the controller 120 can control the speed of the transport stations 102, 106 and other stations to maintain a suitable tension on wire 11. Of course, the tension could be maintained correctly by other means, so that it would be necessary to measure the tension. For example, after shearing, the wire 11 could be reversed by operating the first transport station and letting the second transport station freewheel in order to take up any slack in the wire 11.

The linear distance between first bending station 103 and second bending station 107 is known. However, in order to impart the second bends to wire 11, the serpentine shaped wire is measured before entering the second bending station 107. Measuring station 105 is shown in FIG. 4E. It measures the length of the wire passing through station 105. A pair of rollers 441, 442 bear against the wire 11. At least one roller 441 has its shaft 443 equipped with a suitable rotational measurement system including an encoder 444 that measures the rotation of shaft 443 and converts that rotational motion into an electrical signal transmitted via line 115 to controller 120. The electrical signal from transducer 444 is representative of the length of wire passing between rollers 441, 442. The controller 120 keeps track of the drive speed of the wire as well as the time when the first bends were made by first bending station 103. With that information, coupled with the distance measurement taken by station 105, controller 120 is capable of operating the second bending station 107 in order to bend the wire about its major axis and impart the shape curve to the wire at the appropriate positions thereon.

After wire 11 leaves measuring station 105 it passes through a locator shuttle 85 before entering a second transport station 106. The locator shuttle 85 is coupled to controller 120 via control line 95. The shuttle 85 is similar in construction and operation to shuttle 405 at the output of first bending station 103. The shuttle 85 has a pair of output guide rollers that receive the serpentine wire 11. The rollers of the shuttle 85 are driven by a ball screw under control of the controller 120. The control line 95 carries control signals to the shuttle 85 so that its rollers are moved by its ball screw to correctly position the serpentine wire 11 for entry into the second transport station 106. Transport station 106 is similar in function, construction and operation to first transport station 102.

After leaving second transport station 106, the wire 11 enters the second bending station 107. The second bending station 107 is also shown schematically in FIG. 5. In a preferred embodiment, second bending station 107 comprises a three point bender including three rollers 501, 502, 503. The vertical position of the third roller 501 is suitably controlled by controller 120 in order to impart the shape curve to eyewire 11. Such three point benders are well known to those skilled in the art. As such, as wire 11 passes through second bending station 105, the roller 501 is operated under control of controller 120 to impart the suitable bending to wire 11 that will give it the desired shape curve of eyewinder 109. The controller 120, which knows the distance between the measuring station 105 and the second bending station 107, accurately controls the motion of bending roller 501 in order to impart the shape to eyewire 109.

Upon leaving second bending station 107, the eyewinder 109 passes into the shearing station 108. Shearing station 108 is a so-called double shearing station as shown in FIG. 6A. There, a pair of dies 602, 603 spaced apart from each other receive a punch 601. Punch 601 removes a section 130 from the eyewire 109. It will be noted that the punch 601 can, when dull, leave small burrs on the edges of the eyewire 109. It will be appreciated that these small burrs at the tips 610 are disposed on the inside surface of the eyewire 109. Such burrs on the outside surface are unacceptable to the consumer.

Another feature of the invention that is possible with the controller 120 is horizontal shearing of wire 11. This is achieved by suitably adjusting the roller 501 in second bending station 107 so that about one inch of the eyewire 109 is left perfectly horizontal. That inch is fed out of the second bending station and into the shearing station 108. After the eyewire 109 is sheared, the entire wire 11 is moved in the opposite direction back into the second bending station 107 where the severed portion of the wire 11 is now bent appropriately by roller 501 to provide the next eyewire 109.

The inspection system 140 is shown in further detail in FIG. 7. It is necessary to inspect the finished eyewire because the metallurgical properties of the wire 11 change from one roll to another and also change throughout the unrolling process. As such, there is more plastic deformation of the wire at the end of the roll than at the beginning. Accordingly, it is expected that the metallurgical properties of the wire will vary slightly as the wire is withdrawn from the roll. The purpose of the inspection system 140 is periodically to inspect the wire to see if the individual stations 101–108 need to have their operations altered in accordance with changed conditions of the wire. Of course, if desired, every eyewire 109 may be inspected or selected eyewires of a series, e.g., one of every ten may be inspected.

Figures 7A, 7B, 7C:
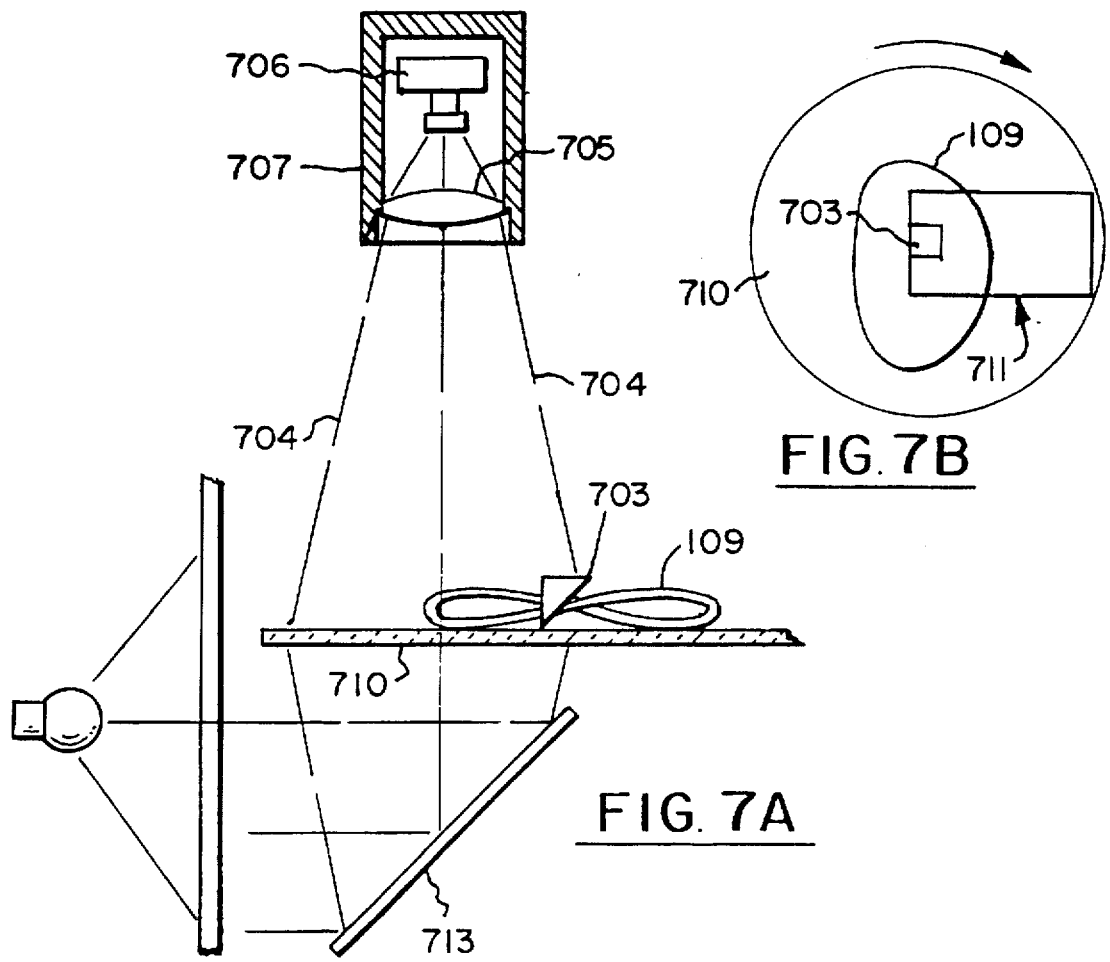
FIG. 7A is a schematic view of the inspection station.
FIG. 7B is a plan view of the stage of the inspection station.
FIG. 7C is an expanded view of the image area of the inspection station.

With reference to FIG. 7A, the eyewire 109 is placed on a glass stage 710 that rotates about an axis. A prism 703 is located at the center of the stage. The function of the prism 703 is to allow light to traverse the stage parallel to the surface of the stage.

A camera 706 is disposed on one side of the stage. A light source 701 with a diffusing screen 702 and a reflection 713 are disposed on the opposite side of the stage. The light from light source 701 casts an image of the eyewire 109 onto the camera 706. The prism 703 casts an image of the inside edge of the eyewire 109 onto the camera 706. The image area of the camera 711 is best shown in FIG. 7B and as expanded in FIG. 7C. The image 713 shows the width W of the wire and the image 712 shows the thickness T of the wire.

As such, as the stage 710 turns, orthogonal images of the same location of the eyewire are projected onto the camera 706. So, the camera sees an image of the major as well as the minor axis of the eyewire 109. As such, at least two dimensions of the eyewire are measured.

As the stage 710 is turned, its position is measured using an optical encoder or other means not shown, that is coupled to the controller 120. The camera is also operated by controller 120 to select a predetermined number of images, something between 200 and 250 images of the periphery of the wire. For each image, the radius of curvature of the wire at that location is derived. It will be appreciated that the image area 711 is fixed. However, the image of the major and minor axis, 712, 713 will vary with the radius of curvature of the base curve and the shape curve of the eyewire 109. As such, the position of the projection of images 712, 713 in the image area 711 is generally a dependent on the radius of curvature of the eyewire 109. The camera 706 is typically a charge coupled device camera. Using data from the 200 to 250 measurements, together with the rotational information for the stage 710, it is possible to measure the length of the wire as well as the curvature of the wire in the vertical plane and the horizontal plane. By measuring the radius of curvature at a predetermined number of points, each of those points can be compared to calculated points of an eyewire of the desired shape. Such comparison is carried out by controller 120. Controller 120 makes a point-by-point comparison of the 200 to 250 locations measured by camera 106 with predetermined radii of curvature in the horizontal and vertical plane. If the eyewire is within the range of tolerance, the controller indicates acceptability by transmitting a signal via output line 160 to display 161. The acceptability indication may take the form of a visual or a printed display 161. If controller 120 determines that one or more radii of curvature are outside the specification limits, then the signal 160 to display 161 will indicate which of the radii of curvature are outside the limits. In one embodiment of the device, a visual display 161 will include a first image of an acceptable eyewire together with an overlay image of the measured eyewire and an indication on the visual display of where the measured image significantly deviates from the ideal image.

The controller 120 will also use the data obtained from the inspection system 140 to alter the operation of the various stations 101–108 in order to optimize the bending of the wire 11 to produce an eyewire 109 in conformity with the desired three-dimensional shape.

Figures 8A, 8B:
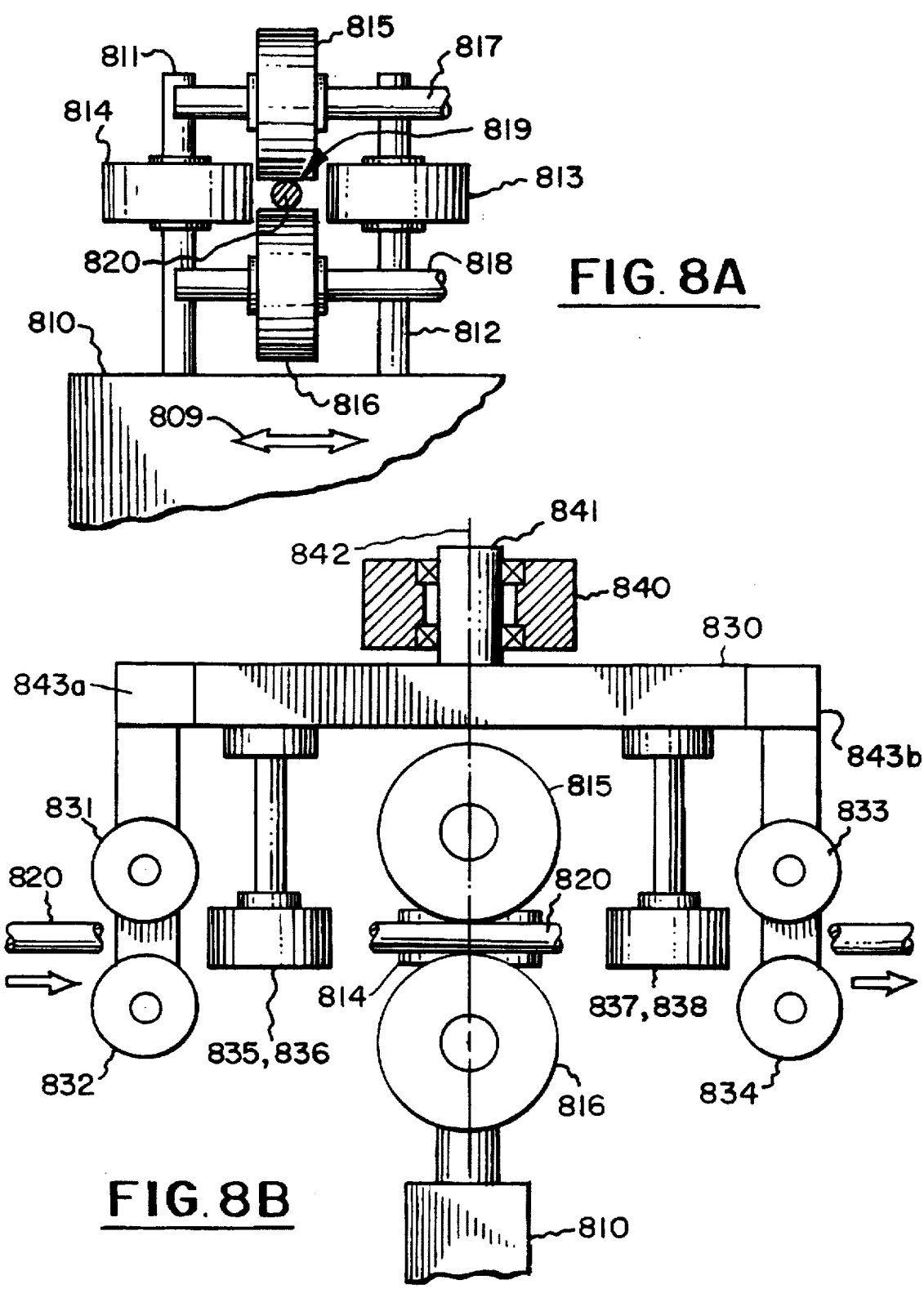
FIG. 8A is a cross-section view of an improved base curve bending station.
FIG. 8B is a cross-sectional view of the base curve bending station of FIG. 8.

With reference to FIGS. 8A–8B there is shown the improved base curve bending station 801 that can be substituted for the first bending station 103. The base curve bending station 801 has a shuttle 810 suitably mounted to move left and right as indicated by the arrows 809. The shuttle 810 holds shafts 811 and 812 of respective pair of side-to-side base curve bending rollers 813, 814. A pair of vertical guide rollers 815, 816 are disposed above and below the wire 820. Guide rollers 815, 816 are mounted on vertical guide roller shafts 817, 818. Shafts 817, 818 are also mounted in the shuttle. However, for the sake of illustration, the particular mounting of the shafts 817, 818 on the shuttle 810 is not shown. In operation, the wire 820 is drawn through a wire bending location 819 that is defined by the space between base curve bending rollers 813, 814. The shuttle 810 moves in either direction 809 as required, imparting the desired base curve (positive or negative) to each point on the body of the wire 820. The reciprocating motion of the shuttle 810 generally occurs constantly during the bending of the given eyewire so that the side profile of the wire is impressed with curves that bend in one direction and then in the other.

With reference to FIG. 8B, there is shown a turntable 830. The turntable 830 has eight rollers 831–838. The rollers of turntable 830 include a pair of horizontal guide input rollers 831, 832 followed by a pair of vertical input guide rollers 835, 836. After leaving the guide rollers 835, 836, the wire enters the cruciform shuttle 810 that is shown in simplified form. It will be noted that the bending roller 813 is omitted from this view for the sake of clarity. After leaving the shuttle 810, the wire 820 passes through a pair of vertical output guide rollers 837, 838 and finally through a pair of horizontal output guide rollers 833, 834. The rollers 831–838 are mounted on a platform 830. Horizontal rollers 831, 832, 833, 834 are mounted in brackets 843a, 843b, that extend in one direction from the platform 830. Vertical rollers 835, 836 and 837, 838 are mounted on shafts that extend directly from the platform 830. The platform 839 has a shaft 841 that turns about an axis 842 inside a set of bearings 840. The axis 842 is transverse to the wire 820 and is parallel with the axes of the bending rollers 813, 814 of shuttle 810. The shuttle 810 moves into and out of the page in the view given in FIG. 8B.

In operation, as the wire passes through the turntable 830, the shuttle 810 imparts curves to the head of the wire as it passes through bending rollers 813, 814. As the curve imparted to the wire 820 passes through output rollers 837, 838 and 833, 834, the bends in the wire will apply a force to those rollers. The force to the rollers will be transmitted to the platform 830 and cause the platform 839 to rotate about the shaft 841.

Since the wire 820 in rollers 833, 834 and 837, 838 is bent, the bend in the wire 820 is accounted for by allowing either the head of the wire or the body of the wire or both to move. In the preferred embodiment of the invention, the head of the wire is held relatively fixed by the next station. As such, the torque imparted to the platform 830 by guides in the succeeding stages will cause the turntable 830 to rotate about axis 842 thereby causing the body of the wire 820 to swing in an arc and thereby accommodate the bend imparted to the wire by bending rollers 813, 814.

The operation of the shuttle 810 with the turntable 830 is similar to an individual grasping a wire between the thumb and two fingers. By pressing the thumb towards the portion of the wire between two fingers, a bend is imparted into the wire. By bending the wire, both the head and the body are deflected. However, the orientation of the head can be maintained if the individual rotates the wrist of the individual's hand. Thus, by holding the orientation of the head of the wire 820 in one direction, applying a bend to the body of the wire 823, the body of the wire moves in a plane perpendicular to the axis of the turntable 830 when the turntable 830 rotates about the axis 842. So, the flagellating motion of the body of the wire 820 is accommodated while simultaneously maintaining a fixed orientation of the head of the wire.

The course of the wire as it leads from the straightener to the basecurve bender is such that it resembles a snake raised to strike. This sigmoidal bend means that, as the head of snake is twisted by the basecurve bender, the twist is easily accommodated by the 'neck' of the snake, without permanent deformation of the wire.

Having thus described the preferred embodiment of the invention, those skilled in the art will appreciate that various modifications, additions, and changes may be made thereto without departing from the spirit and scope of the invention as set forth in the following claims.

What is claimed is:

1. An eyewinder comprising:

a first transport station for transporting a wire;

a first, base curve bending station for bending a wire in a first direction, said base curve bending station having a shuttle having a pair of moveable bending rollers spaced from each other for bending a wire disposed between the bending rollers and passing between said bending rollers and means for translating the bending rollers in at least a first direction to engage and bend the wire as the wire passes between the rollers; and a turntable having an axis of rotation disposed transverse to the first direction of translation of the bending rollers and first and second pairs of guide rollers, each pair of guide rollers disposed on opposite sides of the bending rollers for engaging portions of the wire entering and leaving the bending rollers and forming a three point bending device with the bending rollers;

a second transport station for holding the end of the wire leaving the first bending station and for transporting the wire from the first bending station to the second bending station;

a second bending station spaced from said first (base curve) bending station for bending the wire in a second direction;

a shearing station for shearing a portion of the wire having first and second bends from the rest of the wire;

a controller coupled to the stations for operating the stations in accordance with a predetermined program.

2. The eyewinder of claim 1 wherein the shuttle comprises a pair of guide rollers oriented transverse to the bending rollers for laterally restraining the guide wire between the bending rollers.

3. The eyewinder of claim 1 wherein the turntable further comprises:

third and fourth pairs of guide rollers disposed at opposite ends of the shuttle, the third pair of guide rollers for laterally restraining a wire entering the first bending station and the fourth pair of guide rollers for a laterally restraining a wire leaving the first bending station.

4. The eyewinder of claim 3 wherein the shuttle allows the wire to move in a plane transverse to the axis of rotation of the turntable.

5. A base curve bending station comprising:

a shuttle having a pair of moveable bending rollers spaced from each other for bending a wire disposed between the bending rollers and passing between said bending rollers and means for translating the bending rollers in at least a first direction to engage and bend the wire as the wire passes between the bending rollers; and a turntable having an axis of rotation disposed transverse to the first direction of translation of the bending rollers and first and second pairs of guide rollers, each pair of guide rollers disposed on opposite sides of the bending rollers and forming a three point bending device with the bending rollers.

6. The base curve bending station of claim 5 wherein the shuttle comprises a pair of guide rollers oriented transverse to the bending rollers for laterally restraining the guide wire between the bending rollers.

7. The base curve bending station of claim 5 wherein the turntable further comprises:

third and fourth pairs of guide rollers disposed at opposite ends of the shuttle, the third pair of guide rollers for laterally restraining a wire entering the bending station and the fourth pair of guide rollers for laterally restraining a wire leaving the bending station.

8. The base curve bending station of claim 7 wherein the shuttle allows the wire to move in a plane transverse to the axis of rotation of the turntable.

9. The base curve bending station comprising:

means for bending a portion of a wire;

means for maintaining the orientation of the bent portion of the wire and simultaneously rotating the wire about an axis transverse to a plane containing the bent wire and moving the unbent wire in a plane transverse to said axis.

10. A process for placing a base curve in an elongated wire comprising:

providing a wire having a head portion, a body portion, and a tail portion;

translating said wire along a path;

placing a base curve in said wire at a point along said path by bending the wire in opposite directions transverse to the path of said wire;

holding the bent head of said wire and allowing the rest of the wire to rotate about an axis transverse to a plane containing the bent wire and allowing the body of the wire to move in said plane.

* * * * *